United States Patent [19]

Gyugyi

[11] Patent Number: 4,560,917
[45] Date of Patent: Dec. 24, 1985

[54] STATIC VAR GENERATOR HAVING REDUCED HARMONICS

[75] Inventor: Laszlo Gyugyi, Penn Hills, Pa.

[73] Assignee: Westinghouse Electric Corp., Pittsburgh, Pa.

[21] Appl. No.: 564,059

[22] Filed: Dec. 21, 1983

[51] Int. Cl.$^4$ .............................................. G05F 1/70
[52] U.S. Cl. ..................................... 323/210; 323/255
[58] Field of Search ............... 323/209, 210, 211, 255, 323/258, 343; 363/39, 45, 46

[56] References Cited

U.S. PATENT DOCUMENTS

| 3,999,117 | 12/1976 | Gyugyi et al. | 323/211 |
| 4,104,576 | 11/1976 | Frank | 323/210 |
| 4,220,911 | 9/1978 | Rosa | 323/258 |
| 4,503,380 | 3/1985 | Thanawala | 323/206 |

FOREIGN PATENT DOCUMENTS 0851727 7/1981 U.S.S.R. .............................. 323/258

Primary Examiner—Peter S. Wong
Assistant Examiner—Judson H. Jones
Attorney, Agent, or Firm—Benjamin Hudson, Jr.; John Victor Pezdek

[57] ABSTRACT

There is provided a static VAR generator employing a bank of series-connected inductors, each inductor being supplied by different secondary taps of a step-down transformer. The voltage rating of each inductor is appropriately decreased so as to make their sum correspond to the supply voltage. All but one of the inductors are controlled by thyristors in an on-off fashion to supply reactive power to the network in incremental steps. One of the thyristors is continuously phase-angle fired in combination with the incremental insertion of the other inductors to vary the VAR output over the full range, but generating harmonics that are proportional only to the continuously controlled inductor.

2 Claims, 3 Drawing Figures

STATIC VAR GENERATOR HAVING REDUCED HARMONICS

BACKGROUND OF THE INVENTION

1. Field of the Invention

This invention relates generally to static VAR generators and more particularly to static VAR generators having circuit arrangements to reduce harmonics generated by thyristor-controlled inductors.

2. Description of the Prior Art

In a conventional static VAR generator, a thyristor-controlled inductor is employed as a means to provide continuously variable reactive power output. The reactive power control is achieved by the variation of the firing delay angle $\alpha$ of the thyristor switch, which determines the current flow in the inductor. This method of reactive power control inherently generates harmonics, the magnitude of which are a function of the firing delay angle. Various circuit configurations and control methods have been proposed to reduce the magnitudes of harmonics generated by the thyristor-controlled inductor.

One method employs a 12-pulse circuit arrangement in which two three-phase inductor banks are operated from two three-phase voltage sets that are phase displaced by 30 electrical degrees. The sets are normally provided by a coupling transformer with appropriate secondary windings. In the 12-pulse circuit arrangement, some harmonics such as the fifth and seventh, cancel each other in the primary of the transformer. The disadvantage of this method of harmonic reduction is that it relies on a perfectly balanced circuit and power system, a condition which is difficult to achieve in practice. Also, this method does not reduce some significant harmonics such as the 11th and 13th.

There is shown in U.S. Pat. No. 4,104,576, issued to Harry Frank on Aug. 1, 1978 a static VAR generator system that employs a number of parallel-connected inductors, of which only one has a firing delay angle control, the others are fully on or off for a multibank circuit arrangement. In this static VAR generated design, each harmonic is reduced by the number of inductor banks employed. The disadvantage of this method is that, at a given operating voltage and output power rating established to optimize other components in the static VAR generator or the power system, the thyristor switches may not be fully utilized for their rating which greatly increases the cost of the overall system. This is because the economic utilization of the thyristor switches requires that the full current conducted be close to the rated current of the switches. In the static VAR genrator disclosed, generally a number of inductors, n, is operated at the same voltage level to provide a given output power, the current in each thyristor switch is 1/n of that which would flow if a single inductor was used to provide the same output power. If the output rating required is such that one thyristor switch, at the given voltage level could handle the total current which is often the case in practice, then the harmonic reduction can only be achieved at a considerable cost.

SUMMARY OF THE INVENTION

There is provided by this invention a static VAR generator arrangement which greatly reduced the total cost to reduce the harmonic components supplied to an AC network attainable by sequentially controlling series-connected multi-inductor banks, each inductor bank being fed from different secondary taps of a step-down transformer.

DESCRIPTION OF THE PREFERRED EMBODIMENT

Figure 1:
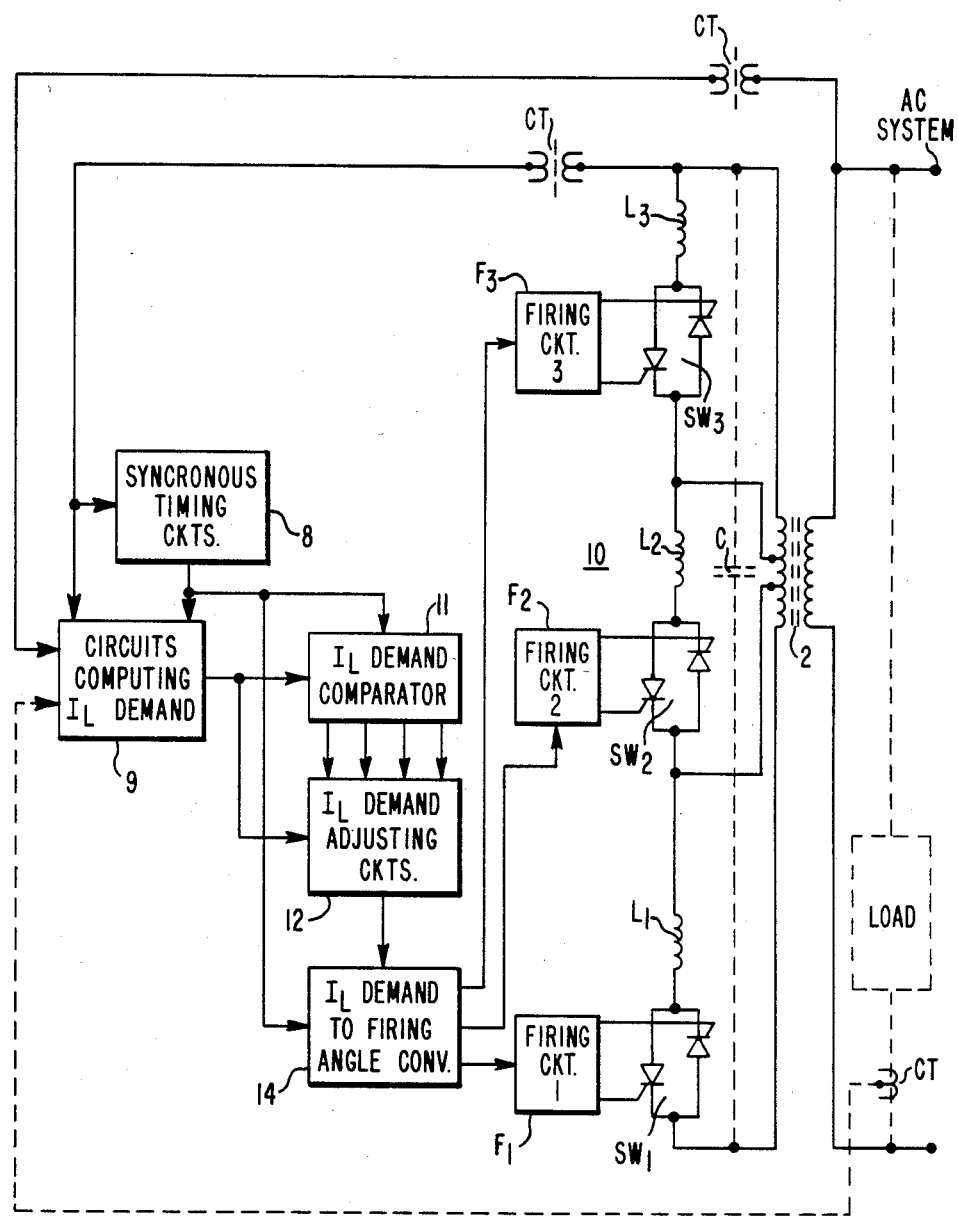
FIG. 1 is a circuit arrangement of a static VAR generator incorporating the principles of this invention.
Figure 2:
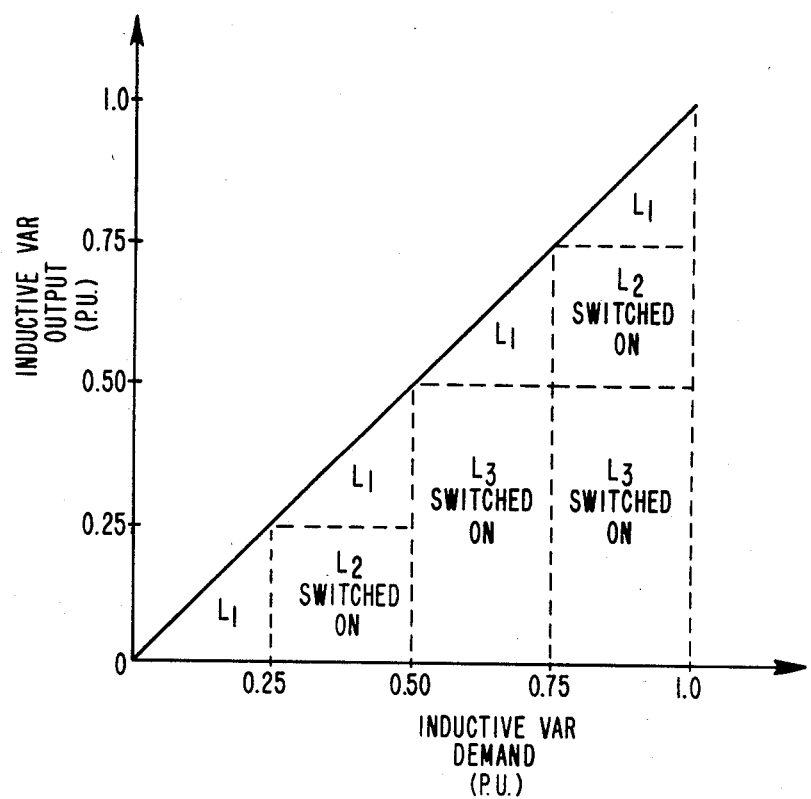
FIG. 2 illustrates a plot for increasing the inductive VAR output in response to demand.

Referring to FIG. 1, there is shown a thyristor controlled inductor bank 10 that is split into a number of series-connected units which are fed from different taps of the secondary of a coupling transformer 2. The current rating of every thyristor controlled inductor unit is the same and it can be rated maximum value. The voltage rating of each unit is appropriately decreased so as to make their sum correspond to the supply voltage. Since a thyristor switch in high power applications normally consists of a relatively large number of series-connected devices, it can be achieved in the proposed circuit arrangement that the total VA ratings of the thyristor switches SW1, SW2 and SW3, and that of the inductors, are essentially the same as that of a single thyristor controlled inductor required to provide the controllable VAR output. The three series-connected thyristor controlled inductors L1, L2 and L3 shown in FIG. 1 are sized such that inductor L3 is rated for one-half of the total controllable output and it is operated at one-half of the secondary voltage of the coupling transformer 2. The other two inductors L1 and L2 are rated for one-quarter of the output and they are operated at one-quarter of the secondary voltage. The total controllable VAR output range is divided into four intervals. In the first interval in which the VAR output is varied from zero to one-quarter of the rated output, the current in inductor L1 is controlled by thyristor switch SW1 using a conventional firing angle delay technique. In the second interval in which the VAR output is varied from one-quarter to one-half of the rated output, the inductor L2 is switched in by thyristor switch SW2, and current in inductor L1 is controlled as in the first interval by firing delay angle control of thyristor SW1. In the third interval, inductor L3 is switched in, inductor L2 is switched out and the continuous control of the current in inductor L1 is maintained by thyristor switch SW1. In the fourth interval, both inductors L2 and L3 are switched in, and the continuous current control in inductor L1 is carried out as in the previous intervals, by firing angle delay control of thyristor switch SW1. The operation of the proposed circuit arrangement is illustrated in FIG. 2. As seen, this circuit arrangement with the control hereinbefore described can vary continuously the VAR output over the four ranges, while generating harmonics that are proportional only to one-quarter of the maximum output current, as a result of continuously controlling the inductor current L1.

Figure 3:
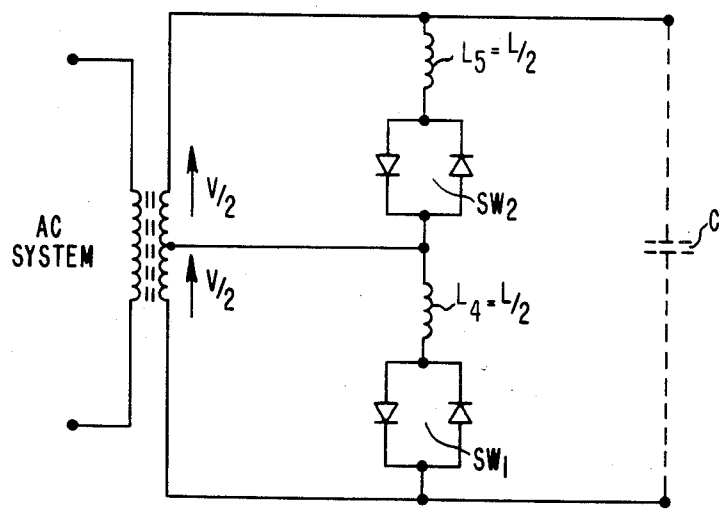
FIG. 3 illustrates an alternate embodiment of a static VAR generator incorporating the principles of this invention.

In FIG. 3, an application is presented wherein a moderate harmonic reduction of 50% is provided obtained by the use of two reactor banks L4 and L5. This allows a very simple implementation of the proposed circuit arrangement tht requires only a center tap secondary on the coupling transformer. The 50% reduction of harmonic content is obtained because only one-half of the total reactive load is varied continuously with VAR generator demand consequently reducing the harmonic content by 50% of the total inductor current supply.

The control circuit for the operation of a static VAR generator herein described can generally be of the type described in U.S. Pat. No. 3,999,177, entitled "Method and Control Apparatus for Static VAR Generator and Compensator", issued to L. Gyugyi and M. B. Brennen. The synchronous timing circuit 8 provides proper timing signals to ensure that the thyristor-controlled inductors are switched in synchronism with AC system voltages.

Computing circuits $I_L$ Demand 9 provide an output signal that is proportional to the total inductor current required to achieve the compensation to the system. Depending on the application, the inductor current demand signal may be determined directly from load current measurements, or from the measurement of the terminal voltage variation, or from the cmbination of both these measurements. Measurements from other variables of the AC system may also be used.

The $I_L$ Demand comparator 11 is in general an n-level comparator determining the levels of inductor current demand at which additional inductor banks must be switched in or out of the system for adequate VAR demand compensation.

The $I_L$ Demand adjusting circuit 12 modifies the inductor current demand signal obtained from the computing circuits $I_L$ Demand 9 in proportion to the number of inductor banks switched in. The modified inductor current demand signal represents the amount of inductor current that is to be drawn by the firing delay angle controlled inductor. The $I_L$ Demand adjusting circuit can be realized simply as a summing unity-gain amplifier, to the input of which DC current signals representing the current in the individual inductor banks are switched by analog FET switching devices. The analog switching devices are operated from the outputs of the $I_L$ Demand comparator which also provides firing signals to the appropriate thyristor switches via clock AND-gates.

The $I_L$ Demand to firing angle converter 14 converts the inductive current demand signal into a real time firing angle delay. It generates the timing for the firing of the thyristor switch that provides the continuous control for the inductor bank L1. Finally, firing circuits F1, F2 and F3 convert the firing logic signals into current pulses and deliver these pulses to the thyristors in the power circuit.

With the above functional blocks, the operation of the proposed VAR generator scheme can be described in the following way. The inductor current demand $I_{LDEM}$ to achieve the compensation desired is determined from the terminal voltage or the load current by the computing circuits for $I_L$ Demand. The inductor current demand signal $I_{LDEM}$, is fed to the $I_L$ Demand comparator which determines which inductor banks should be switched in to approximate the inductor current demand within the current range of the continously controlled inductor below the required $I_{LDEM}$ signal. The output signals of the $I_L$ Demand comparator are AND gated by the synchronous timing circuit and fed to the firing circuits of the thyristor switches controlling the inductors in an ON/OFF fashion. The AND-gating from the synchronous timing circuit ensures that the inductors are switched in at the peaks of the applied voltage, thus causing no transients. The $I_L$ Demand comparator also provides logic signals to the $I_L$ Demand adjusting circuit which in response decreases the original inductor current demand signal in proportion to the currents of the switched inductors. The modified inductor current demand signal $I^*_{LDEM}$, which is within the control range of inductor L1, is fed through the $I_L$ Demand to firing angle converter that determines the delay angle at which the thyristor switch of the continuously controlled inductor is to be fired to obtain the total inductor current required for compensation of the AC network.

Although there has been illustrated and described a specific structure, it is to be clearly understood that the same were merely for purposes of illustration and that changes and modifications may be readily made therein by those skilled in the art without departing from the spirit and the scope of this invention.

I claim:

1. A static VAR generator, comprising:
   (a) a transformer having primary windings connected to an AC network and secondary windings having a multitude of voltage taps therein;
   (b) switching means comprising a plurality of antiparallel connected thyristors connected to said secondary windings for connecting inductors to the AC network for regulating reactive power;
   (c) a first reactance connected to the switching means and parallel with the secondary windings;
   (d) a plurality of reactances each connected in series with one of the antiparallel connected thyristors with the switching means connecting each inductor individually to one of said multiple voltage taps; and
   (e) control means connected to said AC network and said switching means for controlling the connection of the inductors to the AC network in response to the reactive power requirements wherein one of said plurality of inductors is individually and continuously phase-angle fired to control the reactive power of the AC network in combination with on/off control of the other of said plurality of said inductors.

2. A static VAR generator as recited in claim 1 wherein the first reactance is a capacitor.

* * * * *